(12) United States Patent
Li et al.

(10) Patent No.: US 9,576,004 B1
(45) Date of Patent: Feb. 21, 2017

(54) FREE SPACE MANAGEMENT IN DATABASES

(71) Applicant: INTERNATIONAL BUSINESS MACHINES CORPORATION, Armonk, NY (US)

(72) Inventors: Shuo Li, Beijing (CN); Heng Liu, Beijing (CN); Ke Wei Wei, Beijing (CN); Li Yang, Beijing (CN); Xin Ying Yang, Beijing (CN); Jian Wei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 15/005,304

(22) Filed: Jan. 25, 2016

(51) Int. Cl.
G06F 17/30 (2006.01)

(52) U.S. Cl.
CPC .. *G06F 17/30309* (2013.01); *G06F 17/30336* (2013.01); *G06F 17/30598* (2013.01)

(58) Field of Classification Search
CPC ......... G06F 17/30309; G06F 17/30598; G06F 17/30336
USPC .................................. 707/705, 207, 719, 720
See application file for complete search history.

(56) References Cited

U.S. PATENT DOCUMENTS

| 7,720,876 | B2 | 5/2010 | Maxfield |
| 9,020,991 | B2 | 4/2015 | Shuma |
| 2007/0088912 | A1* | 4/2007 | Mukherjee ............ G06F 3/061 711/112 |
| 2007/0198591 | A1 | 8/2007 | Teng et al. |
| 2008/0040406 | A1* | 2/2008 | Maxfield ........... G06F 17/30595 |
| 2009/0113411 | A1* | 4/2009 | Halliday ........... G06F 17/30306 717/169 |
| 2014/0101209 | A1* | 4/2014 | Hunt ................... G06F 12/0253 707/813 |
| 2015/0100606 | A1 | 4/2015 | Bonner et al. |

FOREIGN PATENT DOCUMENTS

CA 2249080 C 9/1998

* cited by examiner

*Primary Examiner* — Evan Aspinwall
(74) *Attorney, Agent, or Firm* — David Zwick

(57) ABSTRACT

Managing free space in a relational database. A data statistics history for the relational database is received, including a distribution of index key columns for a clustering index. Based on the data statistics history, increasing index key columns are identified. A rate of increase of the increasing index key columns is measured. Based on the measured rate of increase and on an estimate of database reorganization frequency, free space for the increasing index key columns is reserved.

18 Claims, 4 Drawing Sheets

FREE SPACE MANAGEMENT IN DATABASES

BACKGROUND

The present invention relates generally to the field of computerized data processing, and more particularly to optimizing data organization of tables and indexes in databases, based on data distribution and growth rate of index keys.

A relational database is a digital database whose organization is based on the relational model of data. This model organizes data into one or more tables, or relations, of rows and columns, with a unique key for each row. Generally, each entity type described in a database has its own table, the rows representing instances of that type of entity and the columns representing values attributed to that instance. Because each row in a table has its own unique key, rows in a table can be linked to rows in other tables by storing the unique key of the row to which it should be linked. Data relationships of arbitrary complexity can be represented using this set of concepts. The various software systems used to maintain relational databases are known as Relational Database Management Systems (RDBMS). Virtually all relational database systems use SQL (Structured Query Language) as the language for querying and maintaining the database.

A table in a relational database may have zero or more indexes. An index is a data structure (most commonly a B-tree) that exists physically on disk. It generally contains one or more ordered columns of the table and logical pointers to data rows in the table. An index is organized in a way that enables direct and fast access to the data in the table. An index key is the set of columns identified in the description of the index. In the absence of an appropriate index, a query may incur a costly full table scan.

In a typical SQL database, the fundamental unit of data storage is the page, or block. The disk space allocated to a data file in a database is logically divided into pages numbered consecutively. Disk I/O operations are performed at the page level. That is, the database server reads or writes whole pages. Data pages include data rows of a table, typically put on the page serially, starting immediately after a header with control information. Index pages include index entries.

If an index is defined for a key with column values that are not continuously increasing (i.e., if key column values for rows newly inserted into the associated table are likely to be less than the key's current maximum column value), then throughput for high-volume insert operations may be constrained by index page split activity. Unlike rows in a table, entries in an index are physically ordered by key column value, which leads to index page splits when new values are inserted into the middle of an index, as will be the case, for example, for an index defined on a non-continuously increasing key column. If the page into which a new index entry must go is full, the page will be split, and a portion of the page's entries will be moved to a previously empty page in the index. Such index splits are generally considered a costly process.

A table space is a storage location where the actual data underlying database objects can be kept. It provides a layer of abstraction between physical and logical data, and serves to allocate storage for database objects, such as tables and indexes, that occupy physical space.

A clustering index (sometimes called a clustered index or index-organized table) determines how rows are physically ordered, or clustered, in a table space. That is, for a table with a clustering index, the order of the rows in the data pages corresponds to the order of the rows in the index. Clustering indexes may provide significant performance advantages for some database operations, particularly those that involve a range of rows. When a table has a clustering index, an insert statement typically causes rows to be inserted as nearly as possible in the order of their index values. As a result, rows in a column are likely to be close together, such that the database server can generally access all the rows in a single read. However, using a clustering index does not guarantee that all rows for a given column value are stored on the same page. The actual storage of rows depends on the size of the rows, the number of rows, and the amount of available free space. Moreover, some pages may contain rows for more than one column value. In what follows, the term index will generally refer to a clustering index.

Reserving free space in table spaces may enable data to remain clustered longer between reorganizations and can reduce the number of overflow rows and indirect references, which can harm performance. Unlike index pages, table space pages are not split. Free space is needed for inserts in clustering order and updates where the size of the row has increased and there is not enough room on the page. For inserts, the row will go to another page. For updates, the row is moved to another page, but the indexes still point to the original page, which in turn points to the new location. This is called an indirect reference.

Reorganizing tables and indexes restores physical continuity of table data and rebuilds indexes into unfragmented, physically contiguous pages. However, reorganizations are time consuming and a database table may be unavailable during reorganization. As a result, the frequency of table/index reorganization may only be, for example, weekly or monthly.

When insufficient free space is available for insert or update operations, new rows may be appended at the end of a table, out of clustering sequence. When updates to existing rows cause them to no longer fit on the original page, indirect references to one or more overflow rows on different data pages may be created. When many of these rows are physically located out of sequence, performance suffers. On the other hand, specifying too much free space may also have disadvantages, including using more disk space for the same amount of data, transferring less data in a single I/O operation, and the data occupying more pages that must be scanned.

SUMMARY

Embodiments of the present invention disclose a computer-implemented method, computer program product, and system for managing free space in a relational database. A data statistics history for the relational database is received, including a distribution of index key columns for a clustering index. Based on the data statistics history, increasing index key columns are identified. A rate of increase of the increasing index key columns is measured. Based on the measured rate of increase and on an estimate of database reorganization frequency, free space for the increasing index key columns is reserved.

DETAILED DESCRIPTION

Figure 1:
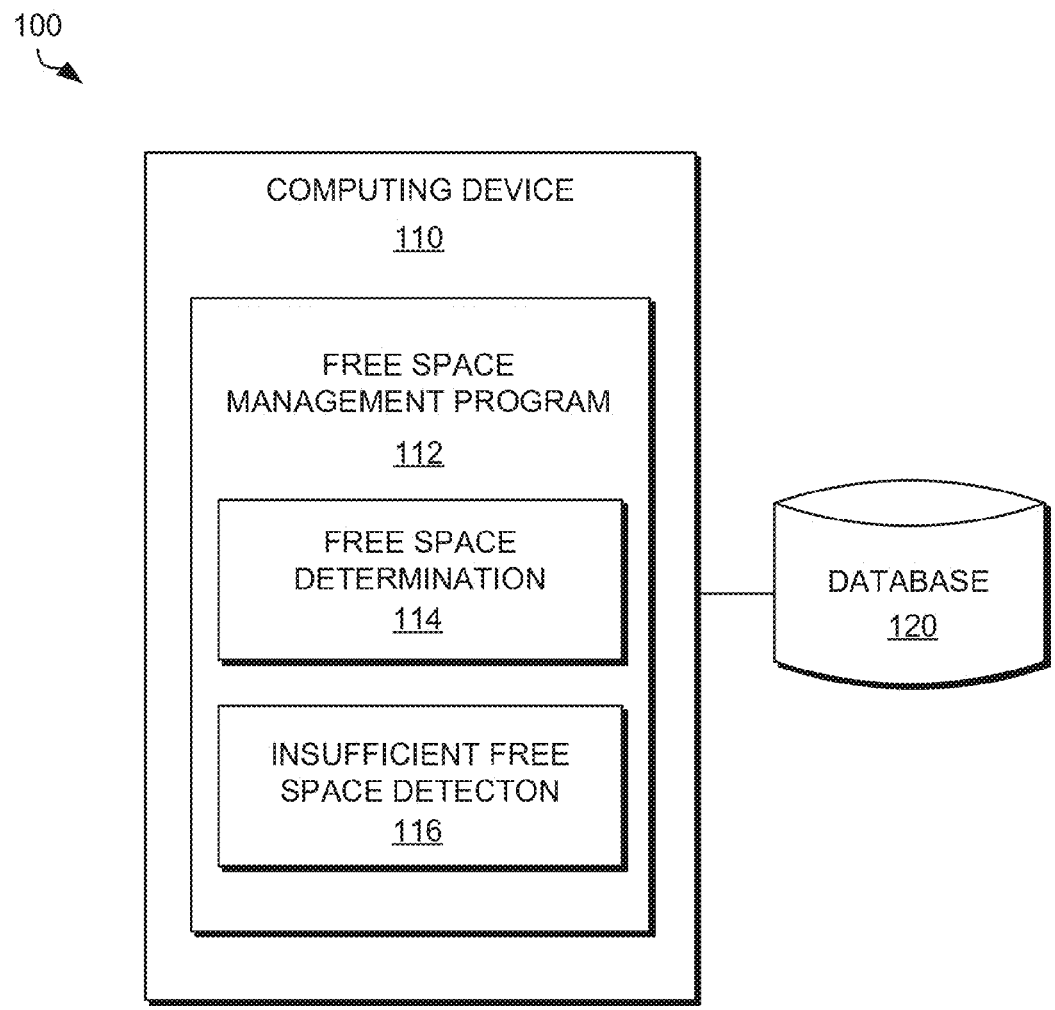
FIG. 1 depicts a functional block diagram of a free space management system, in accordance with an embodiment of the present invention.

Data organization of table spaces and index spaces is a very important characteristic that affects the performance of a relational database management system (RDBMS). For example, if there is not sufficient free space reserved in the table space and/or the index space of a clustering index, the performance of numerous insert commands may be severely degraded if the RDBMS takes a long time to locate data pages or index pages for the newly inserted rows. On the other hand, too much free space may result in wasteful use of disk space and may also result in poor performance of applications which need to access consecutive rows of a table or an index. A desirable goal of intelligent data organization would be to increase the throughput of high-volume insert operations while utilizing disk space efficiently.

It is standard for an RDBMS to give users the option of specifying how free space is managed. In IBM® DB2® 11 for z/OS®, for example, the option FREEPAGE specifies how often to leave a page of free space when data is initially loaded into a table (with LOAD) or the table is reorganized (with REORG); for example, every tenth page. The option PCTFREE indicates what percentage of each page to leave as free space when data is loaded into a table or the table is reorganized. However, in practice, data rows are usually not inserted uniformly into a table or index. For example, suppose that a database for a banking application has an ACCOUNT table that is organized according to a clustering index with columns PROVINCE, BRANCH, and ACCOUNT. If a BRANCH entry has, on average, 100,000 accounts, then it may not make sense to leave free space among the data pages that store the 100,000 account rows, since newly inserted rows would likely be inserted after the 100,000 account rows and before the account rows for the next branch. Free space left within the 100,000 account rows is, therefore, superfluous. Moreover, the space after the 100,000 account rows may not suffice to hold all newly inserted data. Furthermore, different branches may exhibit different growth rates of new account rows. Using one growth rate for all branches, for example via PCTFREE, may be far from optimal. However, no current solution successfully addresses these deficiencies.

In the following, all trademarks and registered trademarks are the property of their respective owners.

Embodiments of the present invention disclose a computer-implemented method, computer program product, and system for improving data organization of RDMS table spaces and index spaces, based on data distribution and growth rate. A free space management mechanism is based on an analysis of index keys rather than on a fixed number of data pages. Free pages may be allocated, or reserved, as a consecutive range of pages, for example corresponding to a range of rows for the same index key column. The number of free pages allocated is calculated based on the growth rate for the specific index key column and on an estimate of how often table/index data is reorganized, i.e., the reorganization frequency.

According to various embodiments, index key columns that increase are detected, based on a data statistics history, and the free space management mechanism is applied to clustering indexes with such keys, and to table spaces that are clustered according to such indexes.

FIG. 1 is a functional block diagram of a free space management system 100, in accordance with an embodiment of the present invention. Free space management system 100 includes computing device 110. Computing device 110 represents the computing environment or platform that hosts free space management program 112. In various embodiments, computing device 110 may be a laptop computer, netbook computer, personal computer (PC), a desktop computer, or any programmable electronic device capable of hosting free space management program 112, in accordance with embodiments of the invention. Computing device 110 may include internal and external hardware components, as depicted and described in further detail below with reference to FIG. 4.

In an exemplary embodiment of the invention, computing device 110 includes free space management program 112 and datastore 120.

Figure 4:
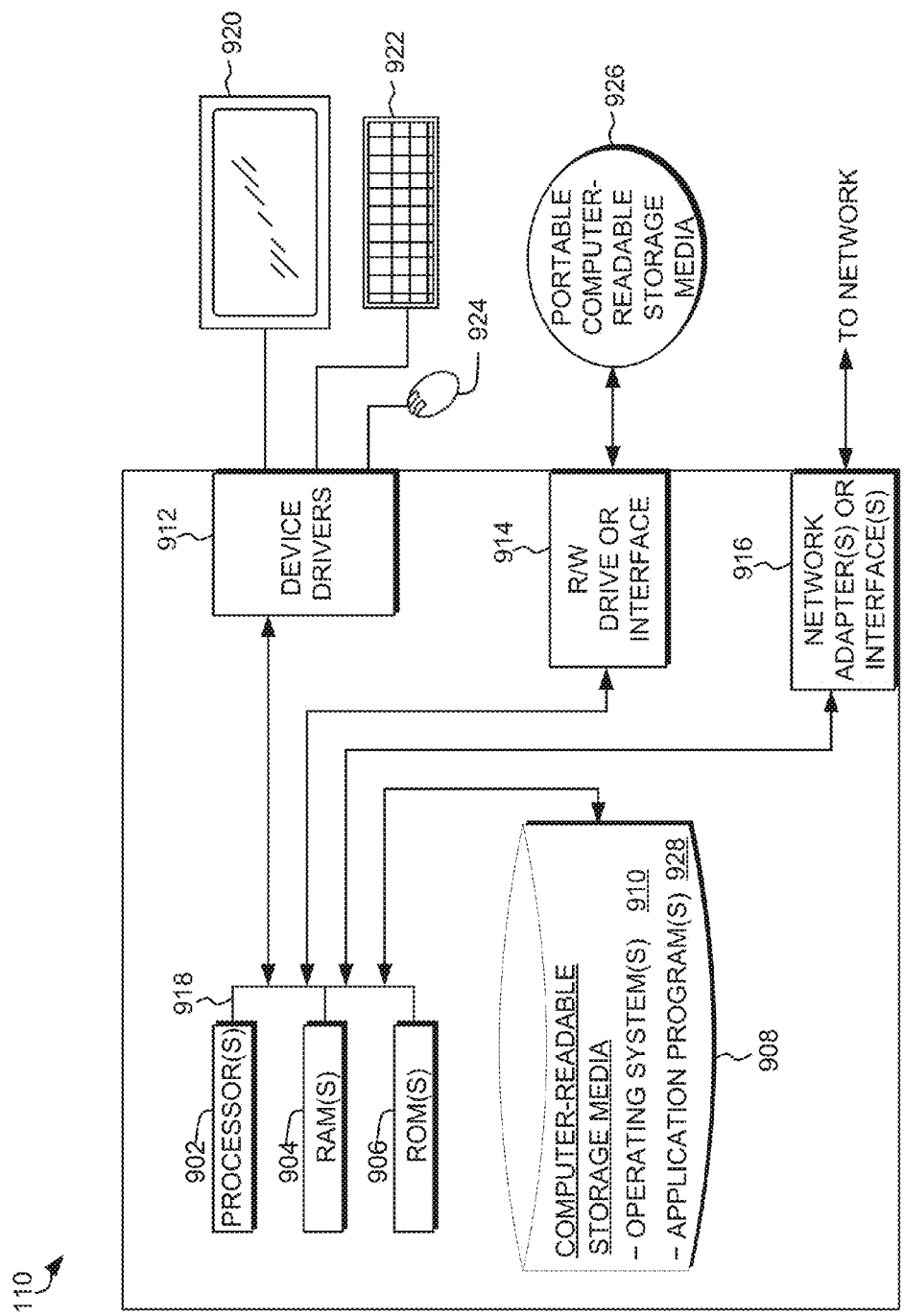
FIG. 4 is a functional block diagram illustrating a data processing environment, in accordance with an embodiment of the present invention.

Datastore 120 represents a store of data that may include one or more databases which may be managed by free space management program 112, in accordance with an embodiment of the present invention. Datastore 120 may reside, for example, on computer readable storage media 908 (FIG. 4).

Free space management program 112, in an embodiment of the invention, operates generally to collect data statistics for index key columns and aggregate them into a data statistics history. Data statistics refers to quantitative data on the distribution of rows and/or pages in a database table and/or index. From the data statistics history, free space management program 112 may identify and measure the growth rate of index key columns that are increasing, and reserve free space based on the data statistics. For example, free space management program 112 may compare highest and/or lowest index key column values over a given time frame to measure the growth rate of specific index key columns. Free space management program 112 may also analyze the data statistics history to validate the process of reserving free space and adapt it accordingly. For example, free space management system may compare the amount of table/index space reserved with the actual amount of table/index space used and adapt the measuring and/or reserving, based on the actual usage of table/index space. Free space management program 112 may include free space determination module 114 and insufficient free space detection module 116.

Figure 2A:
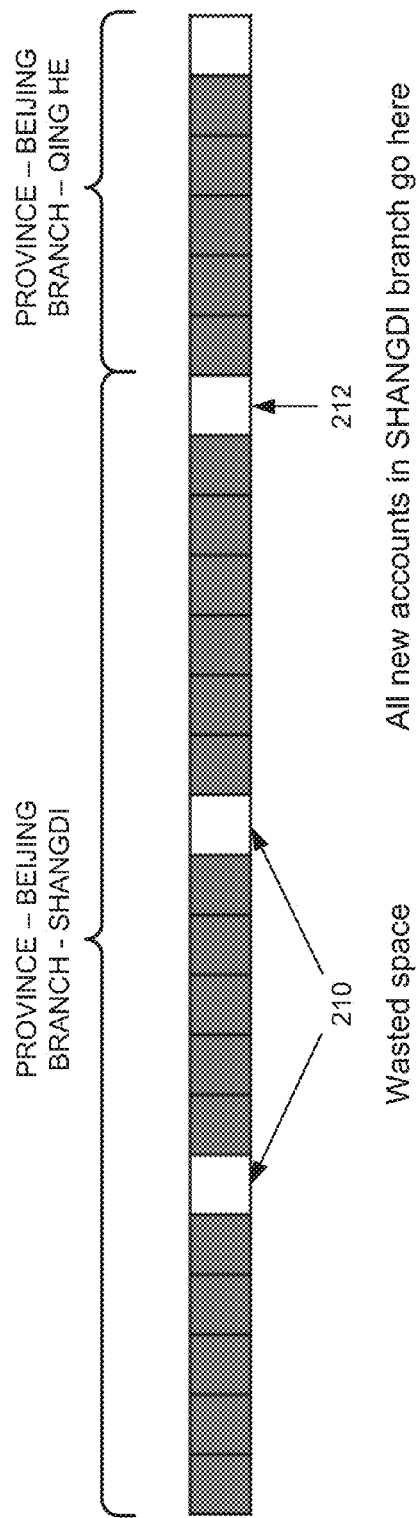
FIGS. 2A and 2B each illustrate occupied and free pages in a database table.
Figure 2B:
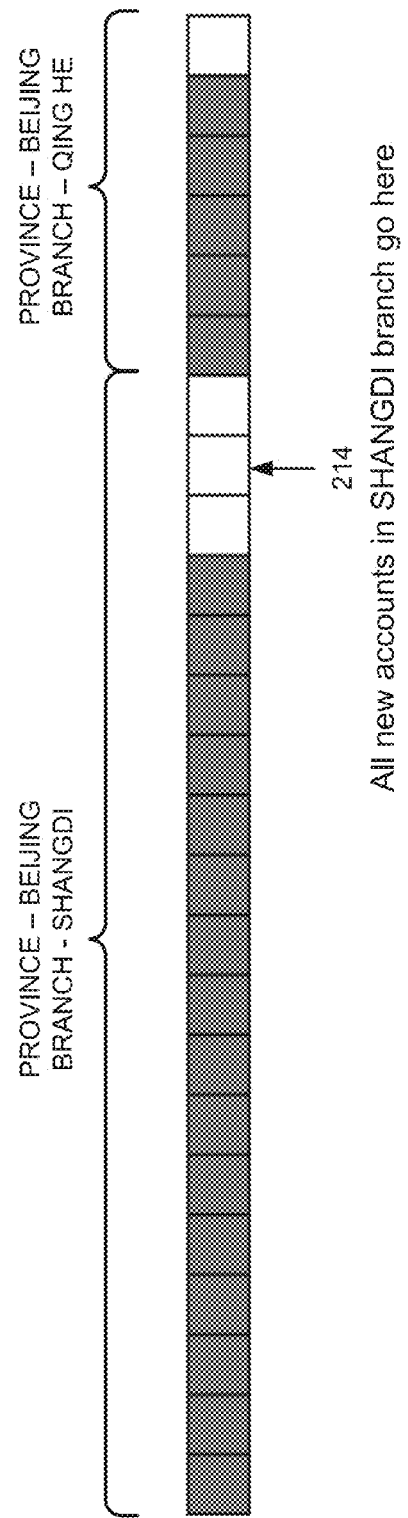

Current free space management systems generally do not take changes in data distribution into account. As a result, free space reserved, for example, for pages or rows that undergo little activity may go to waste, and free space reserved where database activity is high may not suffice. This is illustrated in FIG. 2A, where, in the banking example mentioned above, the first two free pages 210 for the SHANGDI branch are wasted and the third free page 212 may not be sufficient to handle new accounts. When free space is allocated as described below, as illustrated in FIG. 2B, free pages are allocated in a consecutive range 214, which may help to prevent wasted space.

Free space determination module 114 operates to ensure that sufficient free space is allocated, in accordance with an embodiment of the present invention. Free space determination module 114 may track the growth rate of specific index key columns. For example, a program such as the DB2 utility RUNSTATS, system software that collects database statistics information, may be enhanced to collect data distribution information, which may be periodically written to a statistics table. Alternatively, data statistics may be continually gathered and stored by a real-time statistics process. Table 1, below, illustrates an example of the type of information that may be collected in such a statistics table for the banking example. The columns of Table 1 include index name; index key column value; the estimated number of distinct values in a column, or cardinality; and the last transaction time for a particular index key column. Free space determination module 114 may categorize index key columns according to their expected growth rate. For example, a set of dictionary keys may include index key columns that are stable, such as Province, or slowly changing, such as Branch or Province+Branch in the banking example.

Growing keys may include index key columns that vary significantly; for instance, a key defined for the columns Province+Branch+Transaction Time. Free space determination module 114 may identify, as a candidate for an increasing key set, those keys in the growing key set that are not in the dictionary key set, in this case, Transaction Time.

TABLE 1

EXAMPLE STATISTICS TABLE

| INDEX NAME | KEY VALUE | CARD | HIGHEST TRANS TIME |
|---|---|---|---|
| TRANSIX1 | BEIJING, SHANGDI | 100000 | Jul. 7, 2015 12:01:05 |
| TRANSIX1 | BEIJING, QINGHE | 20000 | Jul. 5, 2015 10:33:00 |
| TRANSIX1 | BEIJING, ZHONGGUANCUN | 800000 | Jul. 7, 2015 15:52:32 |
| ... | | | |

Free space determination module 114 may periodically aggregate data distribution information from such statistics tables and save it in a data history table. A subsequent REORG or LOAD operation may invoke free space determination module 114 to access the data history table information, determine the growth rate of increasing index key columns, and determine an appropriate number of free pages to allocate, based on the growth rate and an estimate of when the next reorganization will take place. The free space reserved by free space determination module 114 may be, for example, a calculated amount estimated to at least suffice until the next table/index reorganization.

In certain embodiments of the invention, free space determination module 114 may identify stable or decreasing index key columns and deallocate superfluous free table/index space.

In various embodiments of the invention, the reorganization frequency of index/table data may be a user-supplied parameter. In other embodiments, the reorganization frequency may be estimated from information in a log file or statistics table of database activity.

Table 2 illustrates another example of a statistics table for a banking database, in accordance with an embodiment of the invention. In this example, a group of columns in a database table is labeled with a state and a branch of the bank (STATE, BRANCH). An additional column value, or key, is the latest transaction time (TRANSTIME). In addition to the number of distinct values in the column group (CARD), the lowest key value (LOWKEY) and highest key value (HIGHKEY), corresponding to the first and last transaction times for a column group may be recorded.

TABLE 2

EXAMPLE STATISTICS TABLE

| COLUMNGROUP | COLUMN | COLVALUE | CARD | HIGHKEY | LOWKEY |
|---|---|---|---|---|---|
| STATE, BRANCH | TRANSTIME | CA, SAN JOSE | 3,203,143 | Oct. 30, 2015 20:35:00 | Oct. 30, 2012 20:35:00 |
| STATE, BRANCH | TRANSTIME | CA, SAN FRANCISCO | 2,342,012 | Sep. 15, 2015 18:02:00 | Oct. 30, 2012 20:35:00 |
| STATE, BRANCH | TRANSTIME | NV, LAS VEGAS | 341,523 | Oct. 30, 2015 07:35:00 | Oct. 30, 2012 20:35:00 |
| ... | | | | | |

In this example, free space determination module 114 may identify increasing index key columns by inspecting the HIGHKEY and LOWKEY values of a column in a column group.

For performance reasons, the RUNSTATS utility is typically run infrequently. As an alternative, insufficient free space detection module 116 may apply a dynamic approach to detecting insufficient free space. In an embodiment of the invention, insufficient free space detection module 116 may read and analyze exception records from a database trace, or log, which monitors and records database transactions, that indicate when an INSERT statement could not locate a free page for a new row where a free page should exist. Based on these exception records, free space determination module 114 may compute the growth rate for specific index key columns and allocate additional free space accordingly. In various embodiments, dynamic detection of insufficient free space could be integrated into REORG and/or LOAD utilities. In other embodiments, dynamic detection of insufficient free space could be part of a real-time process.

Figure 3:
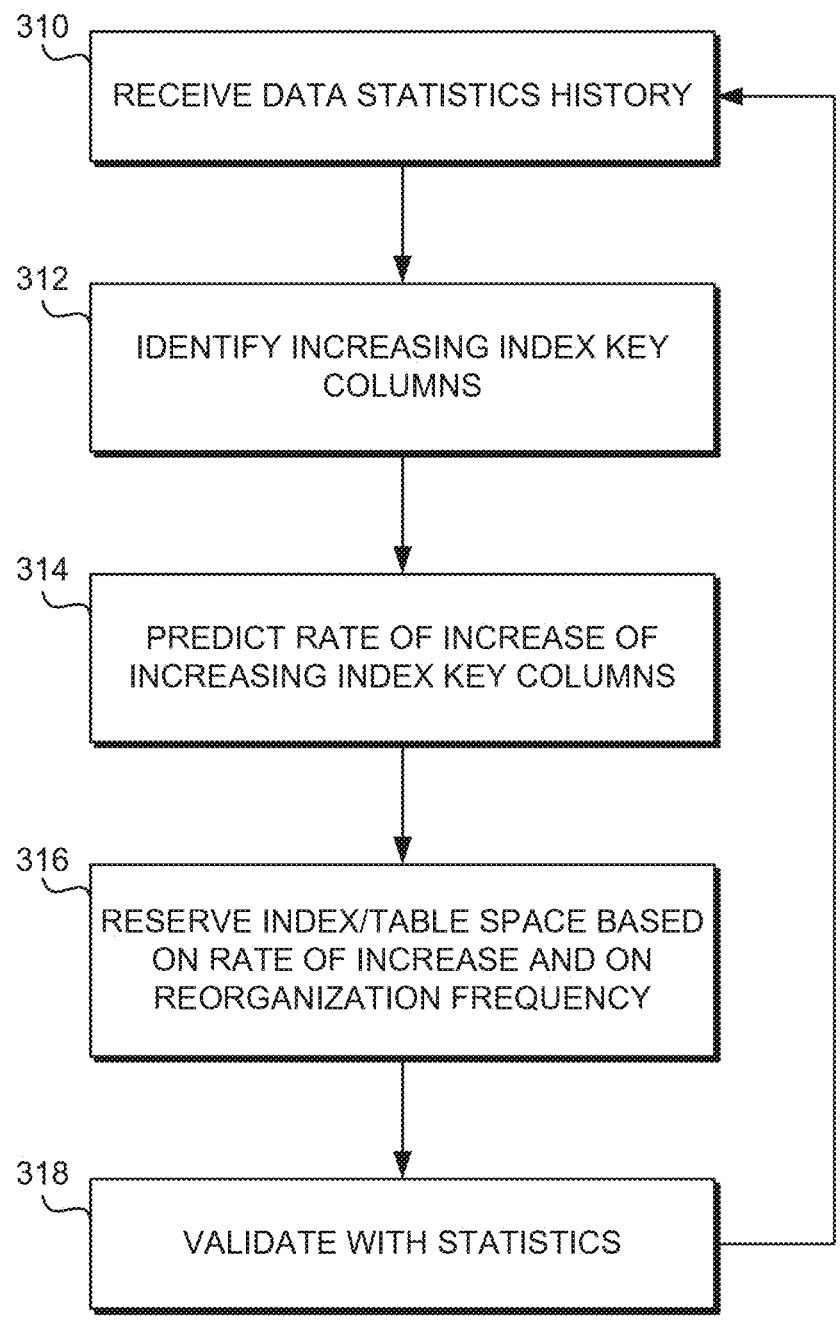
FIG. 3 is a flowchart depicting operational steps of a free space management program, in accordance with an embodiment of the present invention.

FIG. 3 is a flowchart depicting various operational steps performed by computing device 110 in executing free space management program 112, in accordance with an exemplary embodiment of the invention. Free space determination module 114 receives a data statistics history for a database table/index from datastore 120 (step 310). The data statistics history may include number of rows, number of pages, average row length, and distribution of data among the rows/pages. Based on the data statistics history, free space determination module 114 identifies index key columns that are increasing (step 312), and predicts the growth rate of the increasing index key columns (step 314). Free space determination module 114 may then reserve free space based on the growth rates and based on an estimate of reorganization frequency (step 316). Free space determination module 114 may also use the data statistic history to validate the process of reserving free space (step 318). These steps may be repeated while database activity continues.

FIG. 4 depicts a block diagram of components of a computing device 110, in accordance with an embodiment of the present invention. It should be appreciated that FIG.

4 provides only an illustration of one implementation and does not imply any limitations with regard to the environments in which different embodiments may be implemented. Many modifications to the depicted environment may be made.

Computing device 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 928, for example, free space management program 112, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 914 to read from and write to one or more portable computer readable storage media 926. Application programs 928 on computing device 110 may be stored on one or more of the portable computer readable storage media 926, read via the respective R/W drive or interface 914 and loaded into the respective computer readable storage media 908.

Computing device 110 may also include a network adapter or interface 916, such as a TCP/IP adapter card or wireless communication adapter (such as a 4G wireless communication adapter using OFDMA technology). Application programs 928 on computing device 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user s. The device drivers 912, R/W drive or interface 914 and network adapter or interface 916 may comprise hardware and software (stored on computer readable storage media 908 and/or ROM 906).

The present invention may be a system, a method, and/or a computer program product. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer-implemented method for free space management in a relational database, the method comprising:
   receiving, by a computer, a data statistics history for the relational database, including a distribution of index key columns for a clustering index;
   identifying, by the computer, increasing index key columns, based on the data statistics history;
   measuring, by the computer, a rate of increase of the increasing index key columns, wherein the measuring comprises reading and analyzing exception records from a database log to determine how often an insert operation could not locate a free page; and
   reserving, by the computer, free space for the increasing index key columns, based on the measured rate of increase and based on an estimate of database reorganization frequency.

2. A method in accordance with claim 1, further comprising:
   comparing the amount of free space reserved with an actual amount of free space used; and
   adapting the measuring and/or reserving, based on the actual amount of free space used.

3. A method in accordance with claim 1, wherein receiving, by the computer, a data statistics history for the relational database comprises:
   using a database utility program and/or a real-time statistics process to collect data distribution information; and
   aggregating the data distribution information into a statistics history table.

4. A method in accordance with claim 1, wherein identifying, by the computer, increasing index key columns, based on the data statistics history, comprises:
   categorizing index key columns as stable, slowly growing, or growing, based on an expected growth rate in number of column values; and
   identifying the index key columns that are categorized as growing but not as stable or slowly growing.

5. A method in accordance with claim 1, wherein measuring, by the computer, a rate of increase of the increasing index key columns further comprises:
   comparing highest and/or lowest index key column values over a given time frame.

6. A method in accordance with claim 1, wherein the estimate of database reorganization frequency is based on at least one of a user-supplied parameter and a log of database activity.

7. A computer system for free space management in a relational database, the computer system comprising:
   one or more computer processors, one or more non-transitory computer-readable storage media, and program instructions stored on one or more of the computer-readable storage media for execution by at least one of the one or more processors, the program instructions comprising:
   program instructions to receive a data statistics history for the relational database, including a distribution of index key columns for a clustering index;
   program instructions to identify increasing index key columns, based on the data statistics history;

program instructions to measure a rate of increase of the increasing index key columns wherein the program instructions to measure comprise program instructions to read and analyze exception records from a database log to determine how often an insert operation could not locate a free page; and program instructions to reserve free space for the increasing index key columns, based on the measured rate of increase and based on an estimate of database reorganization frequency.

8. A computer system in accordance with claim 7, further comprising:

program instructions to compare the amount of free space reserved with an actual amount of free space used; and program instructions to adapt the measuring and/or reserving, based on the actual amount of free space used.

9. A computer system in accordance with claim 7, wherein program instructions to receive a data statistics history for the relational database comprise:

program instructions to use a database utility program and/or a real-time statistics process to collect data distribution information; and program instructions to aggregate the data distribution information into a statistics history table.

10. A computer system in accordance with claim 7, wherein program instructions to identify increasing index key columns, based on the data statistics history, comprise:

program instructions to categorize index key columns as stable, slowly growing, or growing, according to an expected growth rate; and program instructions to identify the index key columns that are categorized as growing but not as stable or slowly growing.

11. A computer system in accordance with claim 7, wherein program instructions to measure a rate of increase of the increasing index key columns further comprise:

program instructions to compare highest and/or lowest index key column values over a given time frame.

12. A computer system in accordance with claim 7, wherein the estimate of database reorganization frequency is based on at least one of a user-supplied parameter and a log of database activity.

13. A computer program product for free space management in a relational database, the computer program product comprising:

one or more non-transitory computer-readable storage media and program instructions stored on the one or more computer-readable storage media, the program instructions comprising:

program instructions to receive a data statistics history for the relational database, including a distribution of index key columns for a clustering index;

program instructions to identify increasing index key columns, based on the data statistics history;

program instructions to measure a rate of increase of the increasing index key columns wherein the program instructions to measure comprise program instructions to read and analyze exception records from a database log to determine how often an insert operation could not locate a free page; and program instructions to reserve free space for the increasing index key columns, based on the measured rate of increase and based on an estimate of database reorganization frequency.

14. A computer program product in accordance with claim 13, further comprising:

program instructions to compare the amount of free space reserved with an actual amount of free space used; and program instructions to adapt the measuring and/or reserving, based on the actual amount of free space used.

15. A computer program product in accordance with claim 13, wherein program instructions to receive a data statistics history for the relational database comprise:

program instructions to use a database utility program and/or a real-time statistics process to collect data distribution information; and program instructions to aggregate the data distribution information into a statistics history table.

16. A computer program product in accordance with claim 13, wherein program instructions to identify increasing index key columns, based on the data statistics history, comprise:

program instructions to categorize index key columns as stable, slowly growing, or growing, according to an expected growth rate; and program instructions to identify the index key columns that are categorized as growing but not as stable or slowly growing.

17. A computer program product in accordance with claim 13, wherein program instructions to measure a rate of increase of the increasing index key columns further comprise:

program instructions to compare highest and/or lowest index key column values over a given time frame.

18. A computer program product in accordance with claim 13, wherein the estimate of database reorganization frequency is based on at least one of a user-supplied parameter and a log of database activity.

* * * * *